Sept. 25, 1956
S. F. ARMINGTON
2,764,206
TIRE TRACK-FLAT TREAD SHOE
Filed Nov. 8, 1952
2 Sheets-Sheet 1
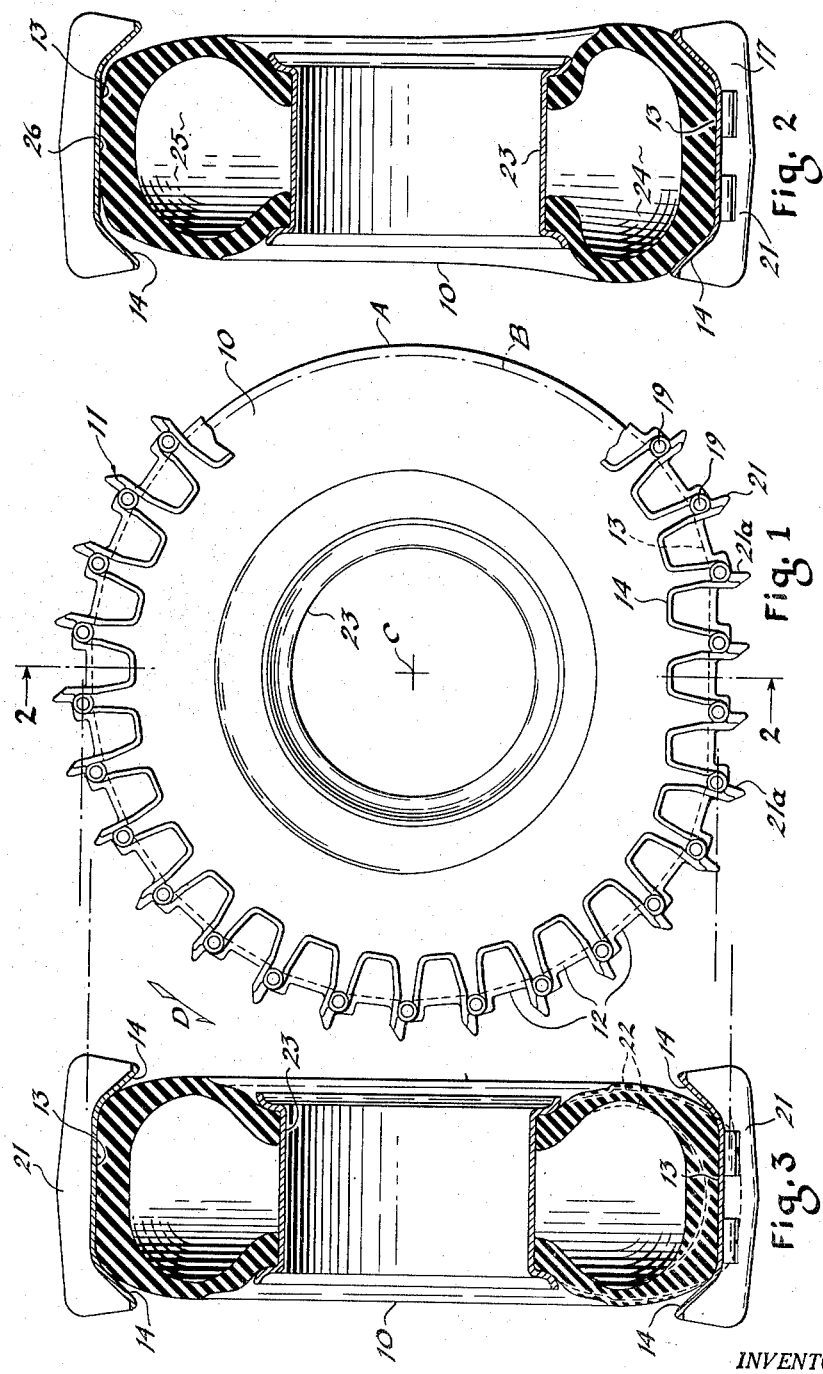
INVENTOR.
Stewart F. Armington
BY
Hyde, Meyer, Baldwin & Doran
ATTORNEYS

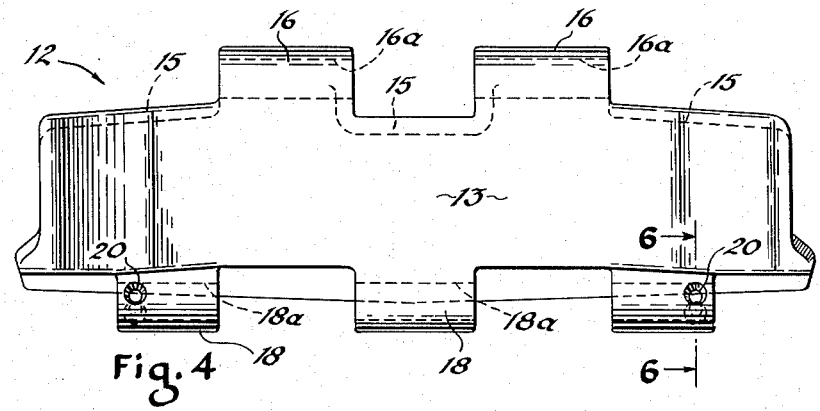
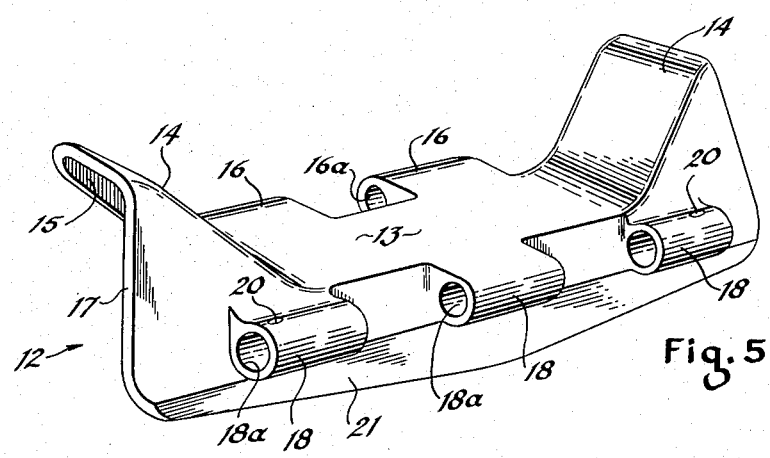
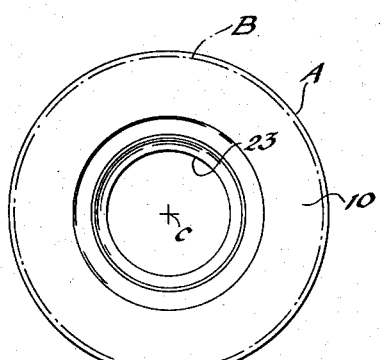
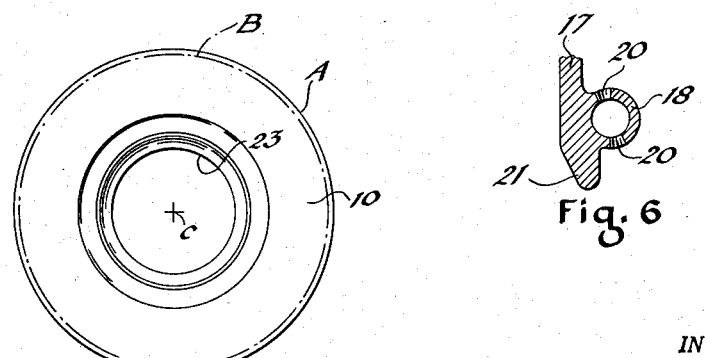
INVENTOR.
Stewart F. Armington
BY
Hyde, Meyer, Baldwin & Doran
ATTORNEYS

United States Patent Office 2,764,206
Patented Sept. 25, 1956

2,764,206

TIRE TRACK-FLAT TREAD SHOE

Stewart F. Armington, Willoughby, Ohio, assignor, by mesne assignments, to General Motors Corporation, Detroit, Mich., a corporation of Delaware Application November 8, 1952, Serial No. 319,588

1 Claim. (Cl. 152—182)

This invention relates to improvements in a combination of a large pneumatic tire and an endless track completely surrounding and partially embracing the tire, said track comprising a plurality of rigid shoes with articulating connections between adjacent shoes.

One of the objects of the present invention is to provide a novel combination between large size pneumatic tire having a tread substantially non-stretchable circumferentially when inflated, together with an endless track comprising a plurality of rigid shoes having flat innermost surfaces where they engage the tread of the tire. The tire has a greater peripheral diameter when inflated to working pressure than the effective internal diameter of the track-engaging portion of the shoes. Thus the tire is bulged laterally or deflected by the belt of track shoes when they are assembled upon the tire. This deflects the tire contour to a flat tread condition so that the tire exerts a substantially constant follow-up pressure to keep the belt tight in all phases of operation.

Other objects and advantages of my invention will be apparent from the accompanying drawings and description and the essential features thereof will be set forth in the appended claims.

In the drawings,

Fig. 1 is a side elevational view showing a pneumatic tire with my improved endless track in position on the tire, and with the entire combination under load;

Fig. 2 is a transverse sectional view taken along the line 2—2 of Fig. 1;

Fig. 3 is a view similar to Fig. 2 but showing in full lines the condition of the endless track and tire when assembled with the tire inflated but under no load. The dotted lines indicate the free tire contour before the tire is bulged or deflected by assembling the endless track upon it;

Fig. 4 is a top plan view enlarged showing one of the shoes of Figs. 1, 2 and 3;

Fig. 5 is a perspective view of one of the shoes shown in Figs. 1, 2 and 3;

Fig. 6 is a fragmental sectional view taken along the line 6—6 of Fig. 4; while

Fig. 7 is a diagrammatic view illustrating the circumference of the tire before and after the endless track is assembled upon it.

Off-the-highway vehicles use large pneumatic tires both for the purpose of carrying the load and for the purpose of floating the load on a large supporting area which is especially necessary where ground conditions are poor for supporting loads such as in mud and sand. With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire so as to give a protective effect to the pneumatic tire and at the same time to increase the tractive effect when such tires are driven in order to propel the vehicle. It is important that an endless track of this type be firmly engaged with the tire at all times so that the tire does not creep within the track and so wear away the rubber. It is also important that the track should not become loosened on the tire so that portions of the track lie down upon the ground loosely ahead of the ground-engaging and driving portion of the track at the bottom of the tire. The present invention is directed toward solving these problems.

The tire illustrated herein is an 18.00 x 25 tire which means that its overall diameter is approximately five feet. My invention is intended for successful operation with such a tire utilizing an internal pressure of 25 pounds per square inch or less.

The tire 10 illustrated herein is of this character. It will be understood that such tires usually have inner tubes but for clarity the inner tube has been omitted from Figs. 2 and 3.

The combination herein disclosed calls for an endless track having smooth surfaces presented toward the tread of the tire and the tire itself may have either a smooth tread or a grooved tread, but the present invention does not involve any inter-engagement of projections between the tread of the tire and the tread-engaging surfaces of the track shoes.

The track 11 is composed of a plurality of rigid shoes, preferably of steel or iron, and having articulating or hinged connections between adjacent shoes. One of these shoes is more clearly seen in Figs. 4 and 5. It will be noted that each shoe 12 is longer crosswise of the tire than its extent circumferentially of the tire. Each shoe has a flat tread-engaging inner surface 13 which is substantially flat for the full width of the tread of the tire as more clearly seen in Figs. 2 and 3. At each end this inner surface toward the tire diverges outwardly and radially inwardly (when the shoe is assembled upon the tire). These wing portions I have designated 14. It will be clear from an examination of Figs. 2 and 3, that the portions 13 and 14 are of metal of comparatively uniform thickness and of such a thickness to give sufficient strength to the shoe but without being very heavy. This same thickness of metal is bent downward at one side as indicated at 15 to form one leg of a generally U-shaped shoe when cut in section circumferentially of the tire. From this wall 15 there extend two hinge lugs 16 having through openings 16a to receive hinge pins. On the other side of the shoe a wall 17 extends downwardly in Fig. 5 from the portions 13 and 14 to form another and longer leg of the U-shaped shoe. This wall 17 is approximately the same thickness as the walls 13, 14 and 15. From the wall 17 the hinge lugs 18 extend in a direction opposite the hinge lugs 16. These lugs also have through openings 18a to receive hinge pins. The lugs 16 and 18 are so spaced that the lugs 16 fit snugly between the lugs 18 when the track is assembled. Hinge pins 19 are then passed through the lugs 16 and 18 and held in position by rivets or set screws passing through the openings 20 in the laterally outermost hinge lugs 18.

The wall 17 of each shoe extends radially beyond the hinge lugs 18 to provide a grouser 21 adapted to bite into the ground to aid the tractive effect. This grouser is deeper at the center of the shoe and shallower at the edges of the shoe.

In operation, the track 11 is assembled on the tire 10 with the tire in deflated condition. Even then, effort must be exerted to assemble the track snugly on the tire so as to compress the tread portion of the tire radially inwardly and to cause the side walls of the tire to be bulged or deflected laterally outwardly by the endless belt of track shoes when assembled on the tire under no load conditions. In Fig. 3, I have shown by broken lines 22 the free tire contour with the tire not confined by the track and under no load. When the tire is assembled inside of the track 11, the track is caused to provide sufficient radially inward compression on the tire tread to cause the normal rounded contour of the tire as shown at 22 to be flattened across the entire flat surfaces 13 of the track shoes. When the vehicle is under no load or light load some flatness in the tire section occurs thus all around the periphery of the tire casing.

In Figs. 1 and 7 the full line A indicates the outer circumference of the tire before the track is assembled upon it. The dot-dash line B shows how the outermost circumference of the tire is compressed radially inwardly by the tension of the endless track 11. The center of the wheel drum 23 and the center of the tire always remain at the point C.

It is well known that the outer periphery of the tread of the tire becomes less when the wheel assembly flattens against the ground under load as indicated in Figs. 1 and 2. Without my invention, this would cause a loosening of the track 11 upon the tire 10. The fact that the tire is originally flattened all around its periphery against the flat surfaces 13 of the track shoes, creates a condition so that the tire will exert a substantially constant follow-up pressure to keep the belt tight in all phases of operation. Referring to Fig. 2, where the tire 10 is flattened against the ground, the tread and side walls bulge outwardly against the wings 14 of each shoe. Some of the air in the internal chamber 24 along the ground portion of the tire is forced around to the non-ground-engaging portions of the tire as indicated at 25 at the top of the tire in Fig. 2. This causes the tire to partially resume its normal rounded contour so that the tread of the tire becomes partially convex outwardly when viewed in section as at the top of Fig. 2. The tire thus maintains a reduced area of contact between the tire and the shoes around substantially all of the non-ground-engaged portions of the track and tire assembly. This still keeps the tire tight in the track.

It will be understood that the track is assembled upon the tire so that when the combination is driving in the direction of the arrow D of Fig. 1, the more or less radially extended faces 21a of the grousers 21 dig into the ground and greatly aid in the tractive effect which the tire is able to provide.

The tire and track assembly herein disclosed is very effective for the purposes intended. The articulated track still permits action of the large tire in floating the weight upon a large area of the ground contacted. At the same time, the metal track provides great protection against wear and abrasion of the tire. The assembly of the track upon the tire in a manner so as to compress the tire entirely around its periphery leads to a constant follow-up of the pressure so as to keep the belt tight at all times, which is desirable. The reduction of this frictional engagement to substantially a line contact around a large portion of the tire as indicated at 26 in Fig. 2, when the tire is loaded, reduces the friction between the tire and the track but is sufficient to keep the track tight upon the tire at all times.

What I claim is:

In combination, a pneumatic tire having a tread substantially non-stretchable circumferentially when inflated, an endless track completely surrounding and engaging said tire at its circumference, said track comprising a plurality of ground engaging rigid shoes which extend across substantially the entire tread of the tire, said tire having a greater peripheral diameter when inflated to working pressure than the effective internal diameter of the track engaging portion of said shoes, each of said shoes having a downwardly extending wall at either side provided with hinge lugs, hinge pins extending through said lugs forming articulating connections between adjacent shoes, said shoes each being longer crosswise of the tire than its extent circumferentially of the tire and having substantially flat, smooth, tire engaging surfaces, each of said shoes having integral wing portions at opposite ends of its flat surface, said wing portions diverging away from said flat surface and radially inwardly of said tire periphery, said tire having its outer side walls curved laterally when inflated to working pressure so that said tread of said tire is flattened against substantially the entire flat surfaces only of said shoes under no load, and under load the bottom portions also of said sidewalls at said working pressure are flattened against said wing portions of said ground engaging shoes providing a flattened zone adjacent said shoes, the air holding capacity and cross-section of said tire being such that the tread of said tire is rounded by the air driven out of said flattened zone to the extent of reducing the area of contact between the tread and shoes under load at non-ground-engaging portions thereof to less than the entire extent of said flat surfaces, while exerting sufficient pressure to keep a tight connection between said tire and shoes at said non-ground-engaging portions.

References Cited in the file of this patent

UNITED STATES PATENTS

| 1,268,402 | Snigo | June 4, 1918 |
| 1,307,036 | Bretscher | June 17, 1919 |
| 1,394,384 | Whitten | Oct. 18, 1921 |
| 1,539,721 | Davis | May 26, 1925 |
| 1,861,276 | Kilborn | May 31, 1932 |
| 2,046,299 | Armington | June 30, 1936 |
| 2,294,772 | Cook | Sept. 1, 1942 |

FOREIGN PATENTS

| 13,006 | Great Britain | 1904 |